US010906604B2

(12) United States Patent
Elfenbein

(10) Patent No.: US 10,906,604 B2
(45) Date of Patent: Feb. 2, 2021

(54) DETACHABLE ACCESSORY CARRIER

(71) Applicant: Karl Elfenbein, Sedro Woolley, WA (US)

(72) Inventor: Karl Elfenbein, Sedro Woolley, WA (US)

(*) Notice: Subject to any disclaimer, the term of this patent is extended or adjusted under 35 U.S.C. 154(b) by 0 days.

(21) Appl. No.: 16/801,129

(22) Filed: Feb. 25, 2020

(65) Prior Publication Data
US 2020/0189680 A1 Jun. 18, 2020

Related U.S. Application Data

(63) Continuation-in-part of application No. 16/168,828, filed on Oct. 24, 2018, now abandoned.

(51) Int. Cl.
A01K 97/10 (2006.01)
B62J 11/05 (2020.01)
B62J 7/04 (2006.01)
B62J 11/00 (2020.01)

(52) U.S. Cl.
CPC ............ B62J 11/05 (2020.02); A01K 97/10 (2013.01); B62J 11/00 (2013.01); B62J 7/04 (2013.01)

(58) Field of Classification Search
CPC . A01K 97/10; B62J 11/00; B62J 11/05; B62J 7/04
USPC .......................... 224/245, 251, 922; 248/523
See application file for complete search history.

(56) References Cited

U.S. PATENT DOCUMENTS

| 988,485 | A | * | 4/1911 | Mitchell | A45B 11/02 224/186 |
| 2,200,183 | A | * | 5/1940 | Legg | A01K 97/10 248/538 |
| 2,913,202 | A | * | 11/1959 | Meldrum | A47G 33/12 47/40.5 |
| 3,167,284 | A | * | 1/1965 | Lynch | B62J 11/00 224/433 |
| 3,582,028 | A | * | 6/1971 | Purdy | A47G 33/12 47/40.5 |
| 3,648,908 | A | * | 3/1972 | Thompson | B62J 11/00 224/442 |
| 3,744,688 | A | * | 7/1973 | Kezer | B62J 7/06 224/442 |
| 3,921,868 | A | * | 11/1975 | Reichbach | B62J 9/00 224/454 |
| 4,150,506 | A | * | 4/1979 | McGinnis | A01K 97/10 248/523 |
| D271,610 | S | * | 11/1983 | Lummis | D22/147 |

(Continued)

Primary Examiner — Justin M Larson
(74) Attorney, Agent, or Firm — Roger A. Jackson

(57) ABSTRACT

A detachable accessory carrier for a bicycle having a seat frame post, the detachable accessory carrier including an extension beam having a proximal end portion and an opposing distal end portion with a longitudinal axis spanning therebetween, also a structure for removable engagement to the seat post wherein the structure is disposed on the proximal end portion, a first base, a first surrounding sidewall having a first open slot with a rotationally engaged second base with a second surrounding sidewall having a second open slot, with a plurality of cantilever flexible tines disposed inside of the first surrounding sidewall to help retain the accessory, wherein the first and second open slots can be rotated to bring the accessory out in sideways movement from the tines.

7 Claims, 11 Drawing Sheets

(56) References Cited

U.S. PATENT DOCUMENTS

| | | | | |
|---|---|---|---|---|
| 4,738,636 A * | 4/1988 | Bolante | H01R 13/59 | 174/652 |
| 4,762,255 A * | 8/1988 | Dunn | B62J 9/00 | 224/424 |
| 4,856,221 A * | 8/1989 | Thompson | A01K 97/10 | 43/21.2 |
| 4,871,099 A * | 10/1989 | Bogar, Jr. | A01K 97/10 | 224/566 |
| 4,877,165 A * | 10/1989 | Behrle | A01K 97/10 | 224/558 |
| 5,231,785 A * | 8/1993 | Roberts | A01K 97/10 | 248/538 |
| 5,307,585 A * | 5/1994 | Thompson | A01K 97/10 | 211/70.7 |
| 5,435,473 A * | 7/1995 | Larkum | B60R 9/08 | 211/4 |
| 5,460,306 A * | 10/1995 | Rudd | A01K 97/10 | 224/535 |
| D381,392 S * | 7/1997 | Darling | D22/147 | |
| 5,715,952 A * | 2/1998 | Chichetti | A01K 97/10 | 211/70.8 |
| 5,815,976 A * | 10/1998 | Jernigan | A01K 97/10 | 43/21.2 |
| 6,209,253 B1 * | 4/2001 | Saldana, Jr. | A01K 97/10 | 224/200 |
| 6,273,391 B1 * | 8/2001 | Engolia | A01K 97/10 | 224/422 |
| D458,878 S * | 6/2002 | Greco | D12/162 | |
| D490,768 S * | 6/2004 | Baynes | D12/407 | |
| 6,749,096 B1 * | 6/2004 | Manos | B62J 11/00 | 224/412 |
| 6,962,018 B1 * | 11/2005 | King | A01K 97/10 | 43/21.2 |
| 7,089,699 B2 * | 8/2006 | Borgeat | A01K 87/06 | 43/18.1 CT |
| 7,131,232 B1 * | 11/2006 | Fecht | A01K 97/10 | 43/21.2 |
| 7,257,922 B2 * | 8/2007 | Willard | A01K 97/10 | 248/523 |
| 7,406,795 B1 * | 8/2008 | Follmar | A01K 97/10 | 248/534 |
| D595,635 S * | 7/2009 | McDonald | D12/407 | |
| D598,689 S * | 8/2009 | McDonald | D6/552 | |
| 7,654,550 B2 * | 2/2010 | Chuang | B62J 11/00 | 280/288.4 |
| 7,686,276 B1 * | 3/2010 | McCauley | A01K 97/10 | 248/535 |
| 7,752,806 B2 * | 7/2010 | Krinner | F16M 11/041 | 47/40.5 |
| D643,358 S * | 8/2011 | McDonald | D12/407 | |
| 8,393,111 B1 * | 3/2013 | Johnson | A01K 97/08 | 43/21.2 |
| D838,213 S * | 1/2019 | Cowan | D12/114 | |
| D844,746 S * | 4/2019 | Peng | D22/147 | |
| 10,426,153 B2 * | 10/2019 | Thomas | F16C 11/10 | |
| 10,709,126 B2 * | 7/2020 | Thomas | F16C 11/10 | |
| 2006/0254118 A1 * | 11/2006 | Warecke | A01K 97/10 | 43/21.2 |
| 2009/0250496 A1 * | 10/2009 | Freyberger | B62J 11/00 | 224/427 |
| 2012/0125962 A1 * | 5/2012 | Hsu | B62J 99/00 | 224/414 |
| 2015/0059230 A1 * | 3/2015 | Ennis | A01K 97/10 | 43/4.5 |
| 2020/0189680 A1 * | 6/2020 | Elfenbein | B62J 11/05 | |

* cited by examiner

DETACHABLE ACCESSORY CARRIER

RELATED PATENT APPLICATION

This is a continuation in part (CIP) patent application of U.S. patent application Ser. No. 16/168,828 filed on Oct. 24, 2018 by Karl Elfenbein of Platteville, Colo., US.

FIELD OF THE INVENTION

The present invention generally relates to a detachable accessory carrier. More particularly, the present invention discloses a detachable accessory carrier for removably engaging articles such as fishing poles, water bottles and the like for use on a bicycle or worn by an individual user.

DESCRIPTION OF THE RELATED ART

When someone engages in their leisure activities especially the activities that are active and requiring body movement, there is always the problem of securing and carrying accessories such as sports items, valuables, food, drink, and other items either upon one's own body or upon a vehicle, like a bicycle for instance. Thus, with a well designed detachable accessory holder, the burdens upon the user are reduced for carrying the above accessories plus the accessories are better protected from damage, and the accessory carrier would be easy to attach and detach from either the individual user or the vehicle.

Looking at the prior art in the field of detachable accessory carriers in U.S. Design Pat. No. D595,635 to McDonald disclosed is a fishing rod holder installed on a bicycle seat support, see in particular the description and FIG. 1.

Further, in looking at the prior art in the field of detachable accessory carriers in U.S. Design Pat. No. D598,689 to McDonald disclosed is a rack-mounted fishing rod holder for bicycle. The broken lines in McDonald '689 showing a bicycle seat, two wing nuts, and a bracket attaching the rod holder to the bicycle rack in FIG. 1 and a bicycle seat, two wing nuts, a bracket attaching the rod holder to the bicycle rack and a fishing rod in FIG. 2 illustrate the portions of the design that form no part of the claim, as stated in the description.

Continuing, looking at the prior art in the field of detachable accessory carriers in U.S. Design Pat. No. D643,358 to McDonald disclosed is a fishing rod holder with a screw bracket attachment and two fishing rod holders.

Yet, further, in looking at the prior art in the field of detachable accessory carriers in U.S. Design Pat. No. D490,768 to Baynes, et al. disclosed is a bicycle fishing pole holder showing an attachment means and rod holder.

Next, in looking at the prior art in the field of detachable accessory carriers in United States Patent Application Number 2012/0125962 to Hsu, disclosed is a detachable accessory carrier for a bicycle, the bicycle having a frame tube bored with a bore, and the detachable accessory carrier comprising: a fixed seat being fixed to the bore and having a positioning portion and a fixing portion extending in different radial directions of the frame tube and communicating with each other. Further in Hsu, a positioning member having an inserting portion at one end thereof, wherein the inserting portion is configured to be inserted to the positioning portion in the radial direction of the frame tube where the positioning portion extends, and includes a propping portion that corresponds to the fixing portion when the inserting portion is set in the positioning portion; a fastener being configured to couple with the fixing portion of the fixed seat and abut against the propping portion of the positioning member, see claim 1.

What is needed is a detachable accessory holder that reduces the burdens on the user for carrying the accessories plus helping to protect the accessories from damage, and the accessory carrier should be easy to attach and detach from either the individual user or the vehicle.

SUMMARY OF INVENTION

Broadly, the present invention is a detachable article accessory carrier for a bicycle having a seat frame post, the detachable accessory carrier including an extension beam having an extension beam proximal end portion and an opposing extension beam distal end portion with a longitudinal axis spanning therebetween, also a means for removable engagement to the seat post wherein the means is disposed on the extension beam proximal end portion. The detachable article accessory carrier further has a first base, a first surrounding sidewall that extends from the first base terminating in a first surrounding sidewall margin, the first surrounding sidewall is about a lengthwise axis defining a first interior, further the first surrounding sidewall includes a first open slot positioned parallel to the lengthwise axis, the first open slot runs from the first base to the first surrounding sidewall margin thereby exposing the first interior to an external environment from the first base to the first surrounding sidewall margin.

Continuing, the detachable article accessory carrier also includes a second base and a second surrounding sidewall that extends from the second base terminating in a second surrounding sidewall margin, the second surrounding sidewall is about the lengthwise axis defining a second interior, further the second surrounding sidewall includes a second open slot positioned parallel to the lengthwise axis. The second open slot runs from the second base to the second surrounding sidewall margin thereby exposing the second interior to an external environment from the second base to the second surrounding sidewall margin, wherein the first base and the first surrounding sidewall are slidably nested with the second interior such that the first and second bases are in slidable contact with one another. Further the second base to the second surrounding sidewall margin has a second length along the lengthwise axis that is less than a first length along the lengthwise axis from the first base to the first surrounding sidewall margin, wherein operationally the second open slot through rotational engagement of the second surrounding sidewall about the first surrounding sidewall can expose a portion of the first open slot or close off a portion of the first open slot to enable a selectably variable slot open area as between the first and second open slots.

These and other objects of the present invention will become more readily appreciated and understood from a consideration of the following detailed description of the exemplary embodiments of the present invention when taken together with the accompanying drawings, in which;

BRIEF DESCRIPTION OF DRAWINGS

FIG. 6 shows a plan view of FIG. 3, wherein FIG. 6 shows the first and second surrounding sidewalls that are rotationally engaged to one another, also shown are the plurality of cantilever flexible tines that are equidistantly spaced about the lengthwise axis, wherein the second base and the second surrounding sidewall are partially rotated about the first base and the first surrounding sidewall to show the ability to selectively control a variable open slot area via rotating the second base and second surrounding sidewall about the first base and first surrounding sidewall, thus the first open slot can be completely closed to allow the cantilever flexible tines to hold and retain the article or fishing rod or completely open to allow the fishing rod to be released from the tines via sliding out the rod in the movement perpendicular to the lengthwise axis;

FIG. 9 shows the FIG. 8 perspective view of a detachable accessory carrier in use, wherein FIG. 9 shows the bicycle seat portion shown and an accessory in the form of a fishing pole or rod with a fishing reel, with the detachable accessory carrier shown that includes the extension beam, the means for removably engagement to the bicycle seat post, the branching arm, the first and second surrounding sidewalls and the first and second bases that are rotationally engaged to one another, wherein the second base and the second surrounding sidewall are rotated about the first base and the first surrounding sidewall to show the ability to selectively open the first open slot with the second surrounding sidewall margin having a stair step configuration for the reel to rest against and the plurality of cantilever flexible tines act to hold and retain the rod;

REFERENCE NUMBERS IN DRAWINGS

Figure 1:
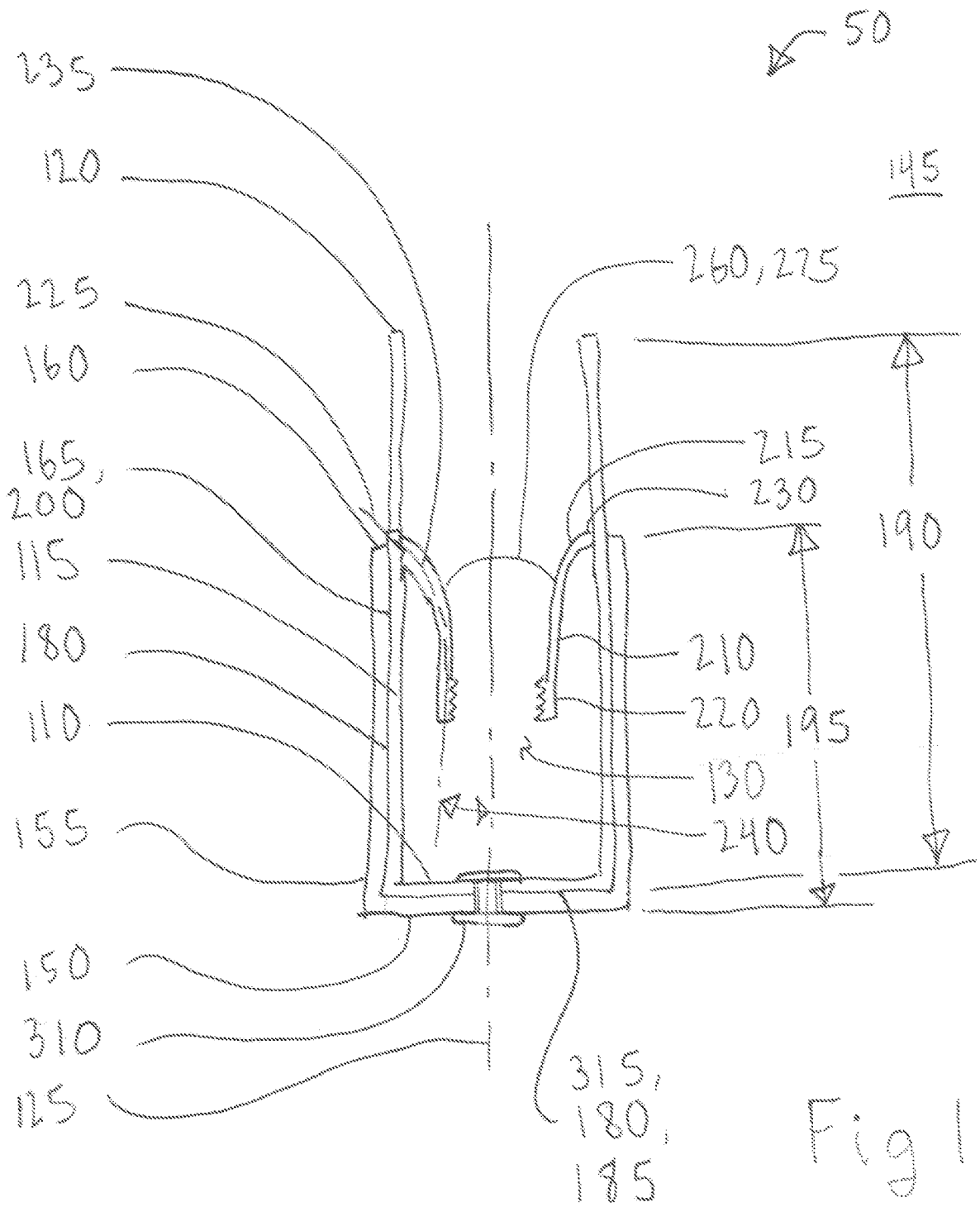
FIG. 1 shows a cross section of a first and second surrounding sidewalls, first and second bases, that are rotationally attached by a fastener, also shown is a plurality of cantilever flexible tines, wherein the first base and first surrounding sidewall are rotationally engaged to the second base and second surrounding sidewall.

50 A detachable accessory carrier for a bicycle
55 Accessory or article
60 Accessory 55 in the form of a fishing pole
61 Fishing rod
62 Fishing reel
70 Bicycle
75 Seat frame post portion of the bicycle 70
80 Extension beam
85 Proximal end portion of the extension beam 80
90 Distal end portion of the extension beam 80
95 Longitudinal axis of the extension beam 80
100 Means for removable engagement to the seat post 75
105 Disposing of the means 100 on the proximal end portion 85
110 First base
115 First surrounding sidewall
120 First surrounding sidewall margin
125 Lengthwise axis of the first surrounding sidewall 115 and the second surrounding sidewall 155
130 First interior
135 First open slot of the first surrounding sidewall 115
140 Parallel position of the first open slot 135 to the lengthwise axis 125
145 External environment
150 Second base
155 Second surrounding sidewall
160 Second surrounding sidewall margin
165 Second interior
170 Second open slot of the second surrounding sidewall 155

175 Parallel position of the second open slot 170 to the lengthwise axis 125
180 Nest of the first base 110 and first surrounding sidewall 115 to the second base 150 and second surrounding sidewall 155 in a slidable manner
185 Slidable contact of the first 110 and second 150 bases to one another
190 First length from the first base 110 to the first surrounding sidewall margin 120
195 Second length from the second base 150 to the second surrounding sidewall margin 160
200 Rotational engagement of first surrounding sidewall 115 to the second surrounding sidewall 155
205 Selectably variable slot open area
210 Cantilever flexible tine
215 Proximal end portion of the tine 210
220 Distal end portion of the tine 210
225 Tine axis
230 Tine proximal end portion 215 extending from the first interior 130
235 Arcuate nature of the tine axis 225
240 Substantially parallel nature of the time axis 225 to the lengthwise axis 125
245 Tine distal end portion contacting the article 55
250 Rotating the second surrounding sidewall 155 about the first surrounding sidewall 115
255 Article 55 exiting the first interior 130 in movement perpendicular to the lengthwise axis 125
260 Plurality of cantilever flexible tines 210
265 Equidistant manner spacing of each of the cantilever flexible tines 210 about the lengthwise axis 125
270 Circumferential loading of the tine distal end portions 220
275 Plurality of cantilever flexible tines 210 having the tine axes 225 converging toward one another forming a frustroconical shape
280 Article different sizes
285 Substantially equidistant cushioning distance between the article 55 and the first surrounding sidewall 115
290 Saw tooth surface of the tine distal end portion 220 that are angled toward the first base 110 or from the tine proximal end portion 215 to the tine distal end portion 220
295 Saw tooth surface 290 contacting the article 55
300 Resisting movement of the article 55 from the tine distal end portion 220 to the tine proximal end portion 215
301 Movement of the first surrounding sidewall 115 from bicycling
305 Resisting movement of the article 55 from the first surrounding sidewall margin 120 to the first base 110
310 Rotationally free fastener disposed between the first 110 and second 150 bases at the lengthwise axis 125
315 Rotational engagement between the first 110 and second 150 bases
320 Stair step configuration of the second surrounding sidewall margin 160
325 Primary side of the second open slot 170
330 Secondary side of the second open slot 170
335 Minimum axial stair step 320 distance on the primary side 325 of the second open slot 170
340 Stair step 320 configuration circumferentially continues and increases
345 Maximum axial stair step 320 distance on the secondary side 330 of the second open slot 170
350 Single stair step
355 Reel resting on a single stair step 350
360 Stair step 320 configuration circumferentially progressively continues and increases in an even progression from the minimum 335 axial stair step 320 distance to the maximum 345 axial stair step 320 distance
365 Affixment of the first surrounding sidewall 115 to the distal end portion 90
370 Branching arm
375 Affixment of the branching arm 370 to the distal end portion 90

DETAILED DESCRIPTION

With initial reference to FIG. 1 shown is a cross section of a first 115 and second 155 surrounding sidewalls and first 110 and second 150 bases, that are rotationally attached 315 by a fastener 310, also shown is a plurality 260 of cantilever flexible tines 210, wherein the first base 110 and first surrounding sidewall 115 are rotationally engaged 315 to the second base 150 and second surrounding sidewall 155.

Figure 2:
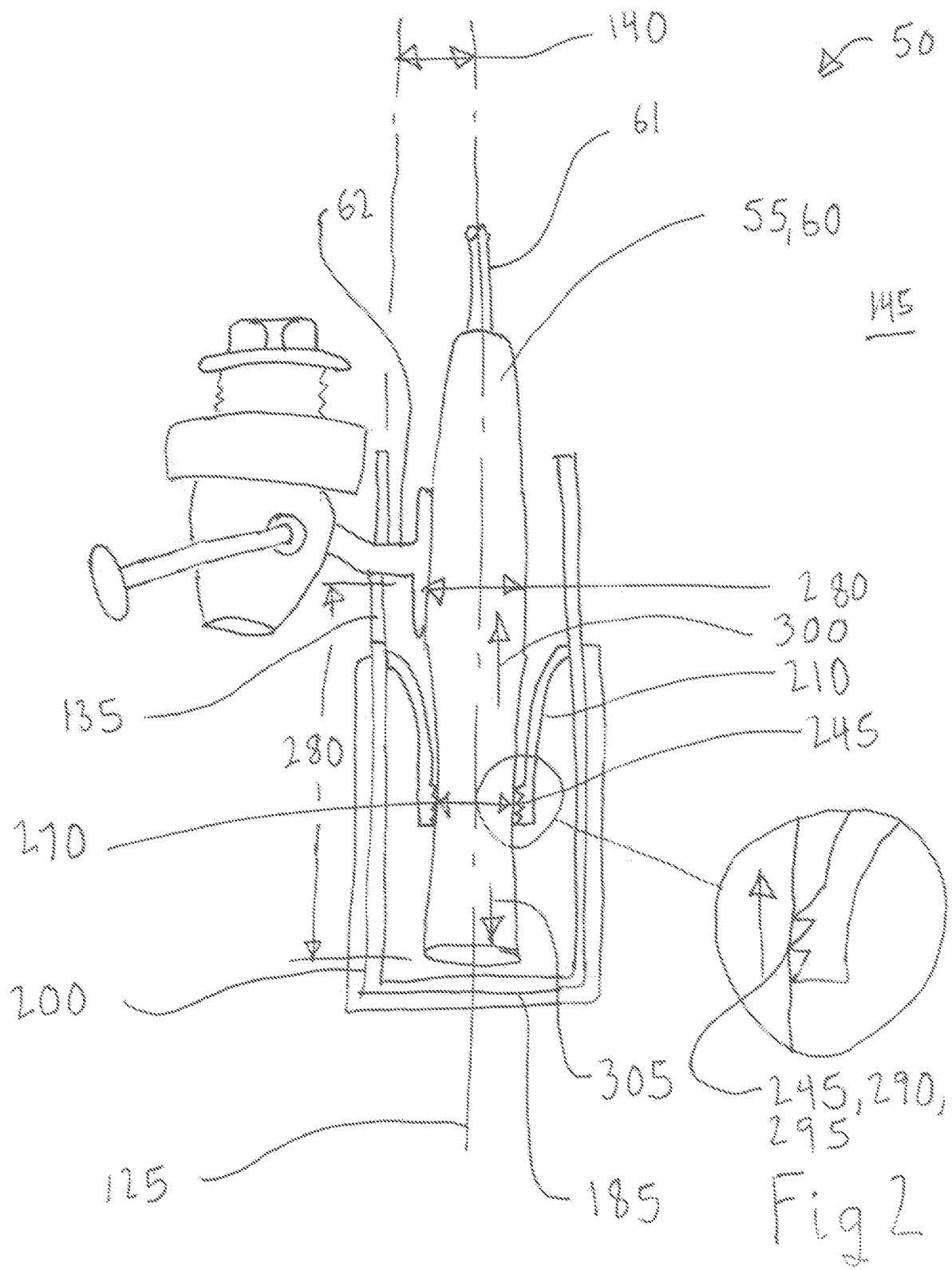
FIG. 2 shows a cross section of the first and second surrounding sidewalls, the first and second bases, that are rotationally engaged to one another, also shown is a plurality of cantilever flexible tines, wherein also shown is an article in the form of a fishing rod and reel, with the rod supported and retained by the cantilever flexible tines with detail also shown of the saw tooth disposed upon the cantilever flexible tine distal end portion also showing the unidirectional saw tooth direction to resist the rod moving from the first base to the first surrounding sidewall margin.

Next, FIG. 2 shows a cross section of the first 115 and second 155 surrounding sidewalls and the first 110 and second 150 bases, that are rotationally engaged 315 to one another, also shown is the plurality 260 of cantilever flexible tines 210, wherein further shown is an article 55, 60 in the form of a fishing rod 61 and reel 62, with the rod 61 supported and retained by the cantilever flexible tines 210 with detail also shown of the saw tooth 290 disposed upon the cantilever flexible tine 210 distal end portion 220 also showing the unidirectional saw tooth 290 direction to resist 300 the rod 61 moving from the first base 110 to the first surrounding sidewall 115 margin 120.

Figure 3:
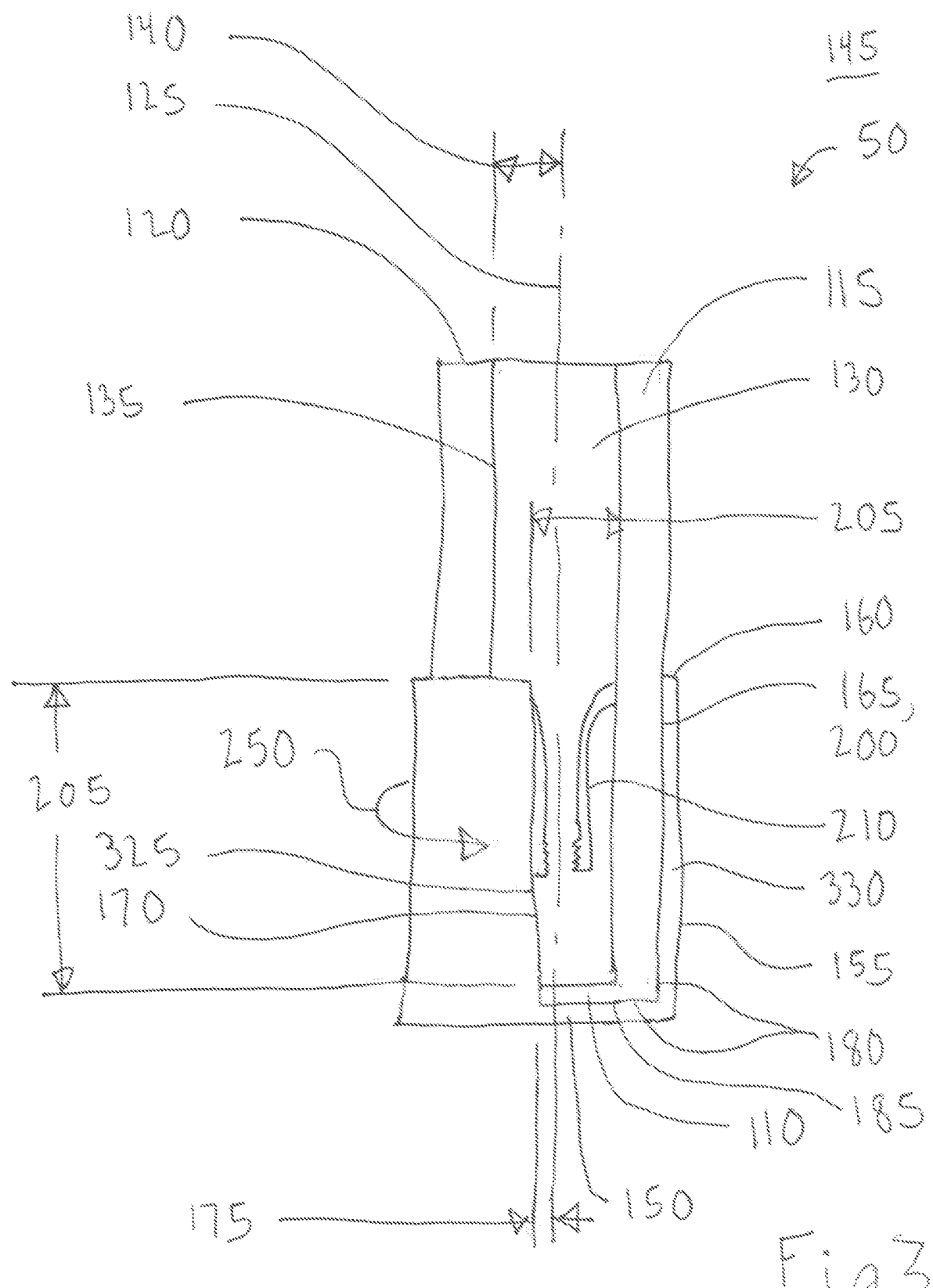
FIG. 3 shows view 3-3 from FIG. 6 that shows a cross section of the first and second surrounding sidewalls and the first and second bases that are engaged to one another, also shown are the plurality of cantilever flexible tines, wherein the second base and the second surrounding sidewall are partially rotated about the first base and the first surrounding sidewall to show the ability to selectively control a variable open slot area via rotating the second base and second surrounding sidewall about the first base and first surrounding sidewall, thus the first open slot can be completely closed to allow the cantilever flexible tines to hold and retain the article or fishing rod or completely open to allow the fishing rod to be released from the tines via sliding out the rod perpendicular to the lengthwise axis.
Figure 6:
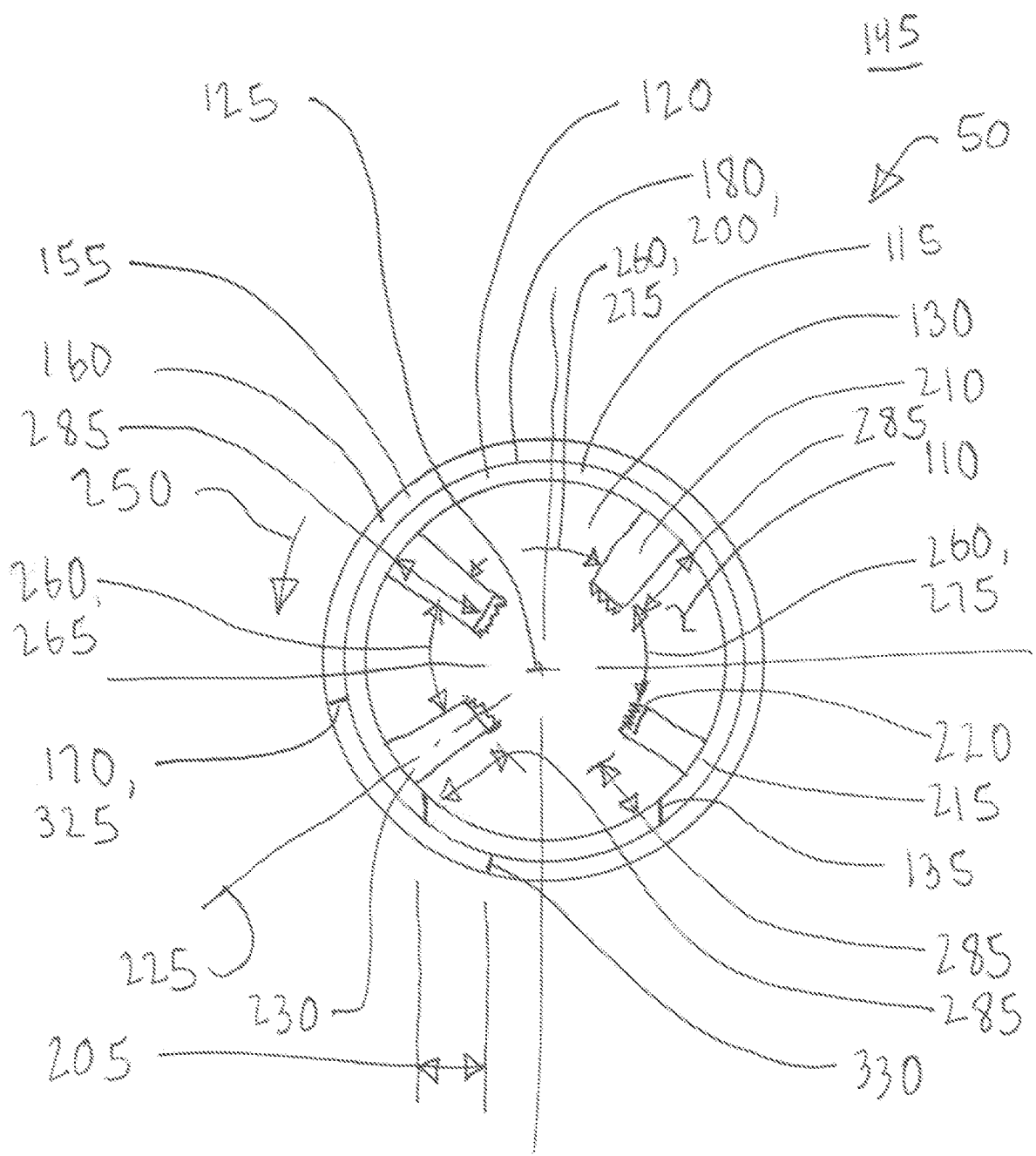

Further, FIG. 3 shows view 3-3 from FIG. 6 that shows a cross section of the first 115 and second 155 surrounding sidewalls and the first 110 and second 150 bases that are rotationally engaged 315 to one another, also shown are the plurality 260 of cantilever flexible tines 210, wherein the second base 150 and the second surrounding sidewall 155 are partially rotated 250 about the first base 110 and the first surrounding sidewall 115 to show the ability to selectively control a variable open slot area 205 via rotating 250 the second base 150 and second surrounding sidewall 155 about the first base 110 and first surrounding sidewall 115. Thus in FIG. 3, the first open slot 135 could be completely closed to allow the cantilever flexible tines 210 to hold and retain the article 55, 60 or fishing rod 61, or the first open slot 135 to be completely open to allow the fishing rod 61 to be released from the tines 210 via sliding 255 out the rod 61 in movement perpendicular 255 to the lengthwise axis 125.

Figure 4:
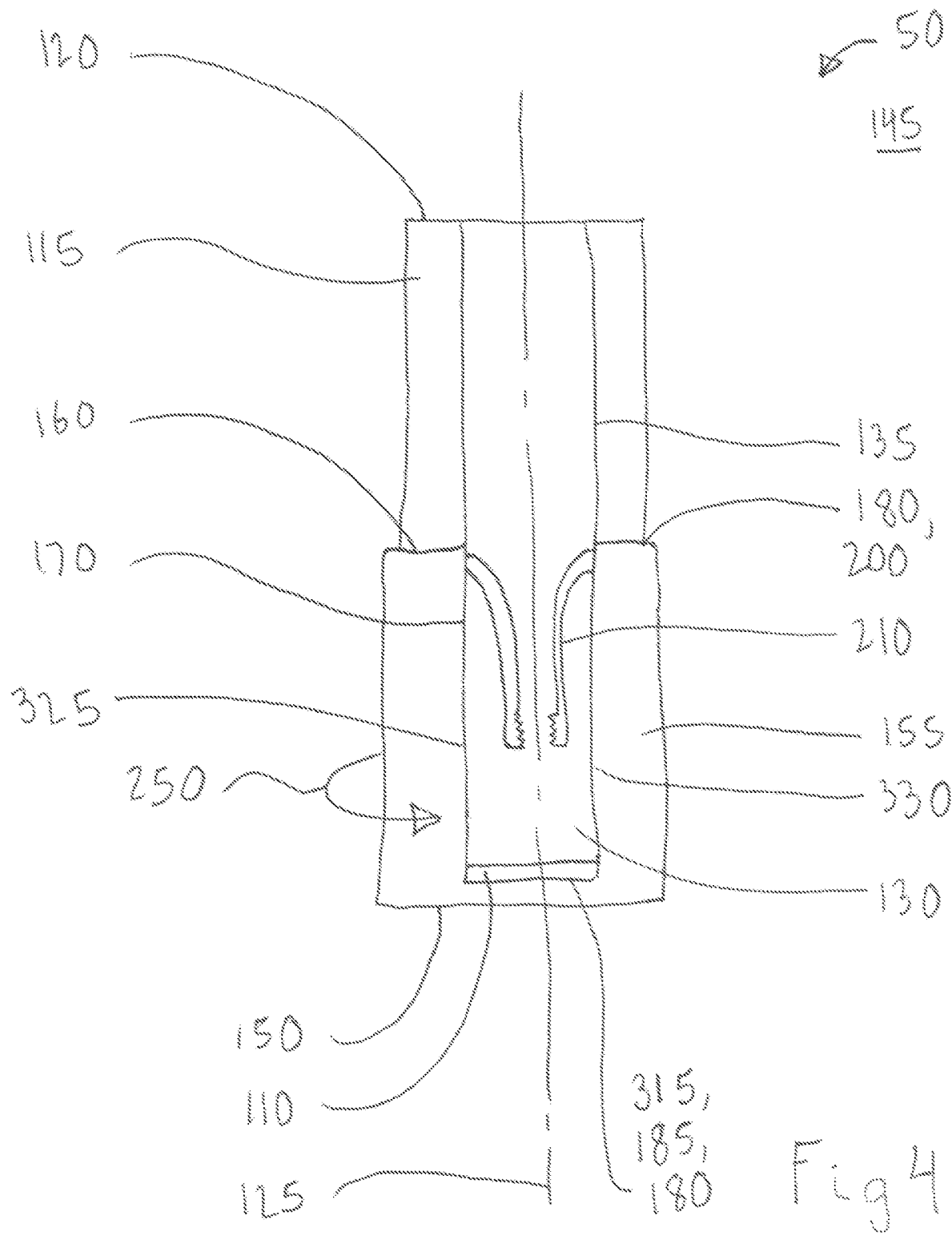
FIG. 4 shows a cross section of the first and second surrounding sidewalls and the first and second bases that are engaged to one another, also shown are the plurality of cantilever flexible tines, wherein the second base and the second surrounding sidewall are rotated about the first base and the first surrounding sidewall to show the ability to selectively completely open the first open slot, to allow the fishing rod to be released from the tines via sliding out the rod in a movement perpendicular to the lengthwise axis.

Continuing, FIG. 4 shows a cross section of the first 115 and second 155 surrounding sidewalls and the first 110 and second 150 bases that are rotationally engaged 315 to one another, also shown are the plurality 260 of cantilever flexible tines 210, wherein the second base 150 and the second surrounding sidewall 155 are rotated 250 about the first base 110 and the first surrounding sidewall 115 to show the ability to selectively completely open the first open slot 135, to allow the fishing rod 61 to be released from the tines 210 via sliding 255 out the rod 61 in movement perpendicular 255 to the lengthwise axis 125.

Figure 5:
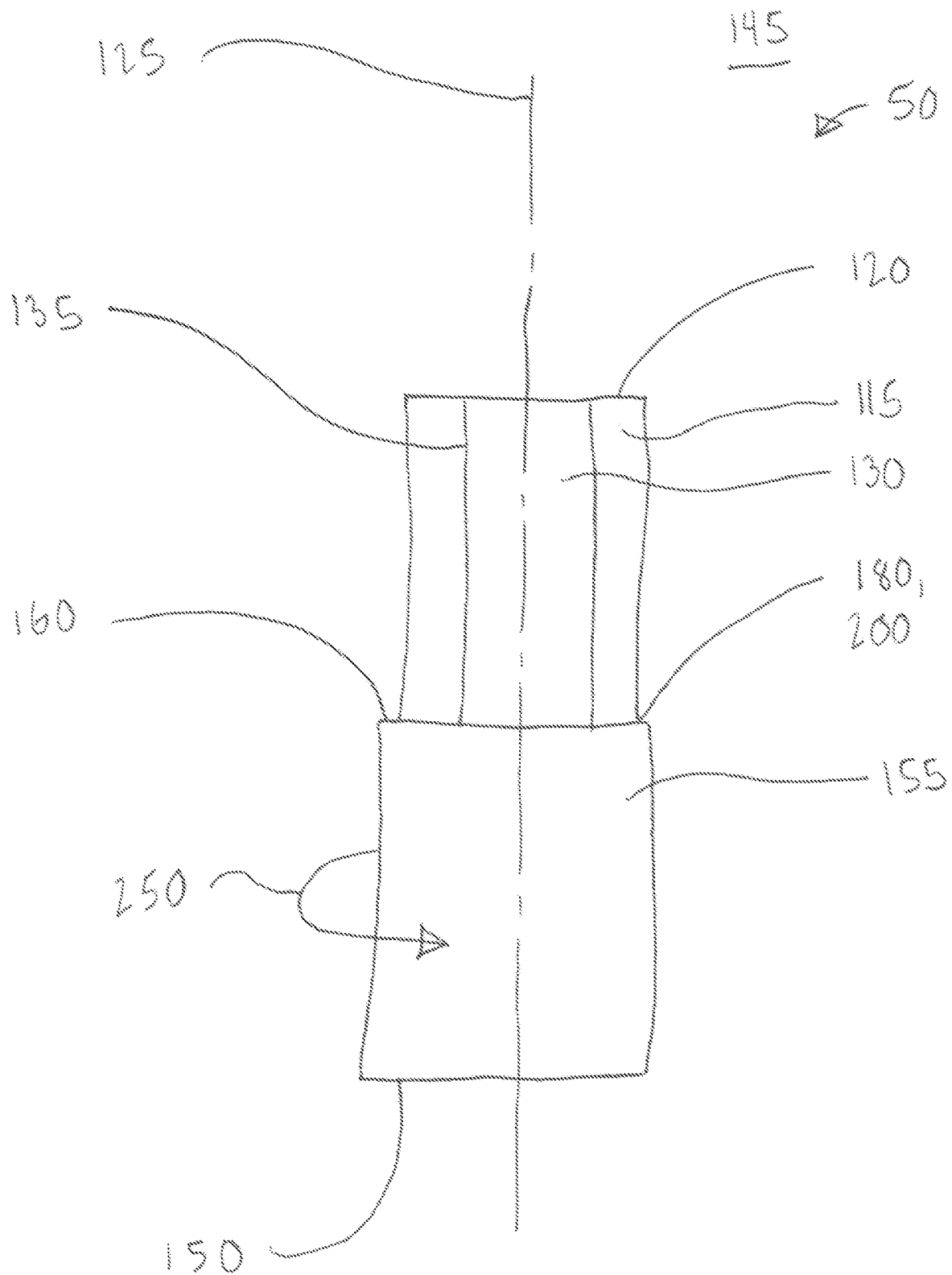
FIG. 5 shows a cross section of the first and second surrounding sidewalls and the first and second bases that are engaged to one another, wherein the second base and the second surrounding sidewall are rotated about the first base and the first surrounding sidewall to show the ability to selectively completely close the first open slot, to keep the fishing rod to be supported and held from the tines.

Moving onward, FIG. 5 shows a cross section of the first 115 and second 155 surrounding sidewalls and the first 110 and second 150 bases that are rotationally engaged 315 to one another, wherein the second base 150 and the second surrounding sidewall 155 are rotated 250 about the first base 110 and the first surrounding sidewall 115 to show the ability to selectively completely close the first open slot 135, to keep the fishing rod 61 to be supported and held from the tines 210.

Further, FIG. 6 shows a plan view of FIG. 3, wherein FIG. 6 shows the first 115 and second 155 surrounding sidewalls that are rotationally engaged 315 to one another, also shown are the plurality 260 of cantilever flexible tines 210 that are equidistantly spaced 265 about the lengthwise axis 125, wherein the second base 150 and the second surrounding sidewall 155 are partially rotated about the first base 110 and the first surrounding sidewall 115 to show the ability to selectively control a variable open slot area 205 via rotating 250 the second base 150 and second surrounding sidewall 155 about the first base 110 and first surrounding sidewall 115. Thus in FIG. 6, the first open slot 135 can be completely closed to allow the cantilever flexible tines 210 to hold and retain the article 55, 60 or fishing rod 61 or completely open to allow the fishing rod 61 to be released 255 from the tines 210 via sliding out 255 the rod 61 in movement perpendicular 255 to the lengthwise axis 125.

Figure 7:
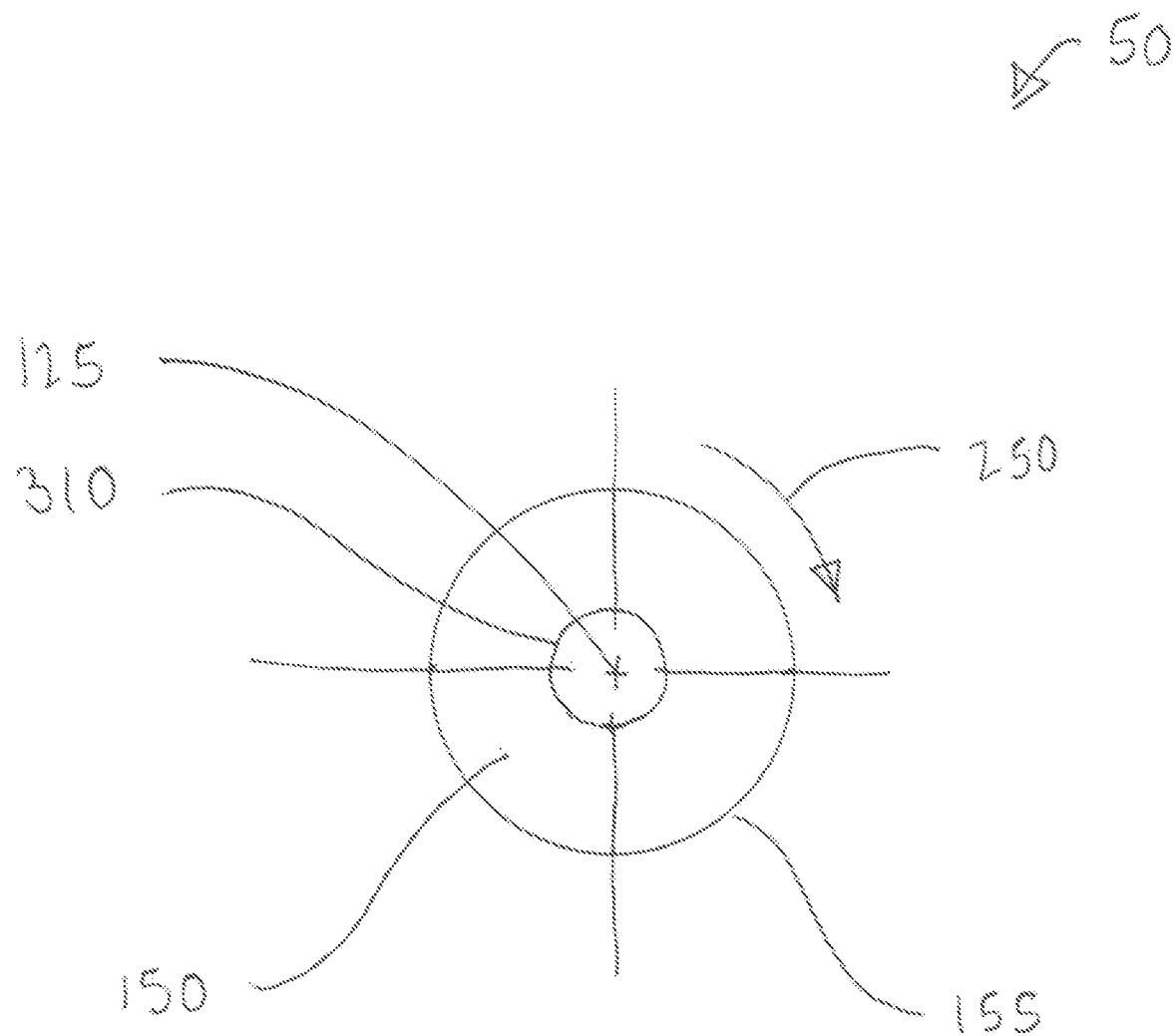
FIG. 7 shows a view of the second base only showing specifically the rotationally free fastener positioned at the lengthwise axis that rotationally retains the first and second bases to one another.

Continuing, FIG. 7 shows a view of the second base 150 only showing specifically the rotationally free fastener 310 positioned at the lengthwise axis 125 that rotationally 315 retains the first 110 and second 150 bases to one another.

Figure 8:
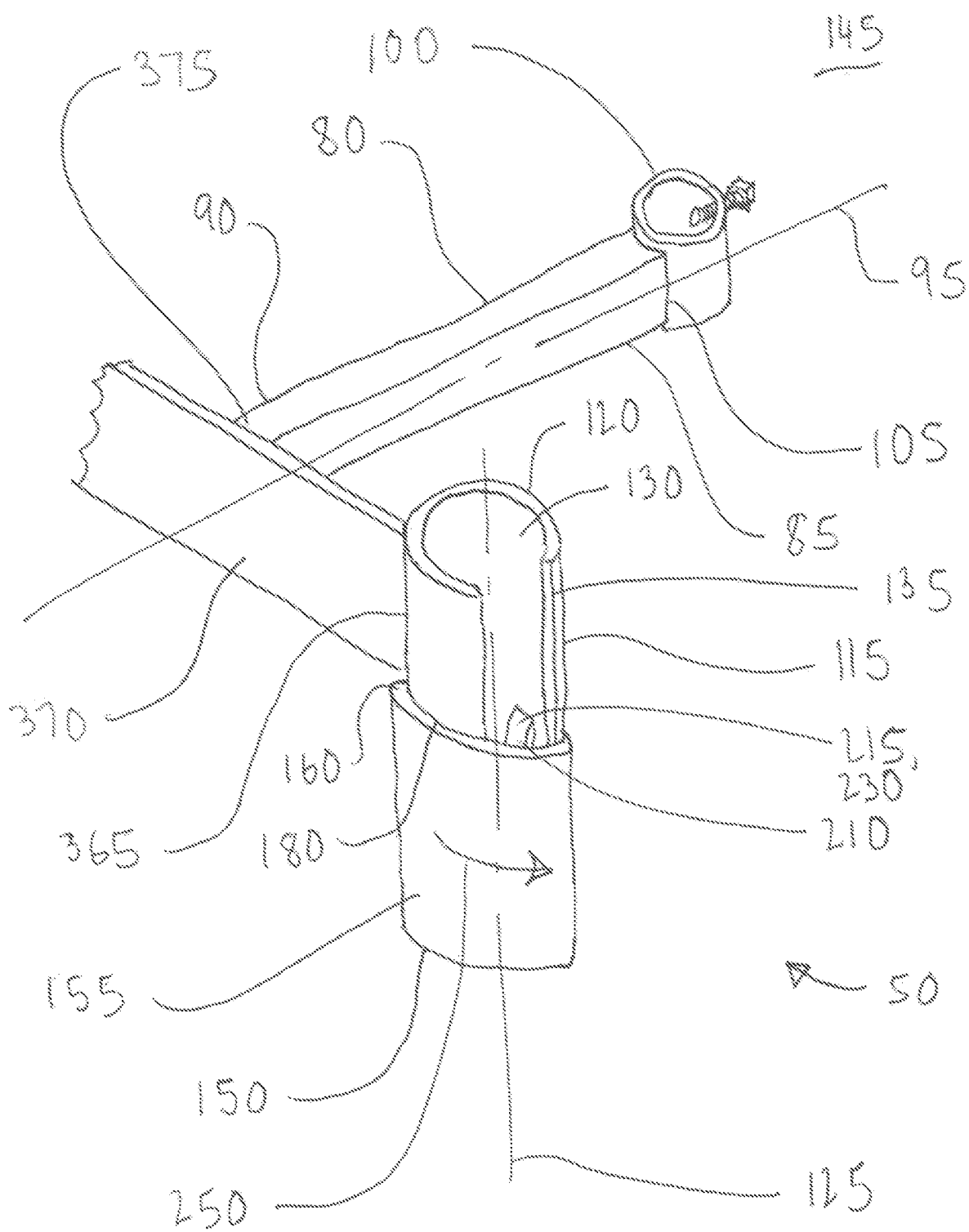
FIG. 8 perspective view of the detachable accessory carrier for a bicycle that includes an extension beam, a means for removably engagement to a bicycle seat post, a branching arm, and the first and second surrounding sidewalls and the first and second bases that are rotationally engaged to one another, wherein the second base and the second surrounding sidewall are rotated about the first base and the first surrounding sidewall to show the ability to selectively completely close the first open slot, to keep the fishing rod to be supported and held from the tines.

Next, FIG. 8 is a perspective view of the detachable accessory carrier 50 for a bicycle 70 that includes an extension beam 80, a means 100 for removably engagement to a bicycle seat post 75, a branching arm 370, and the first 115 and second 155 surrounding sidewalls and the first 110 and second 150 bases that are rotationally engaged 315 to one another, wherein the second base 150 and the second surrounding sidewall 155 are rotated 250 about the first base 110 and the first surrounding sidewall 115 to show the ability to selectively completely close the first open slot 135, to keep the fishing rod 61 to be supported and held from the tines 210.

Figure 9:
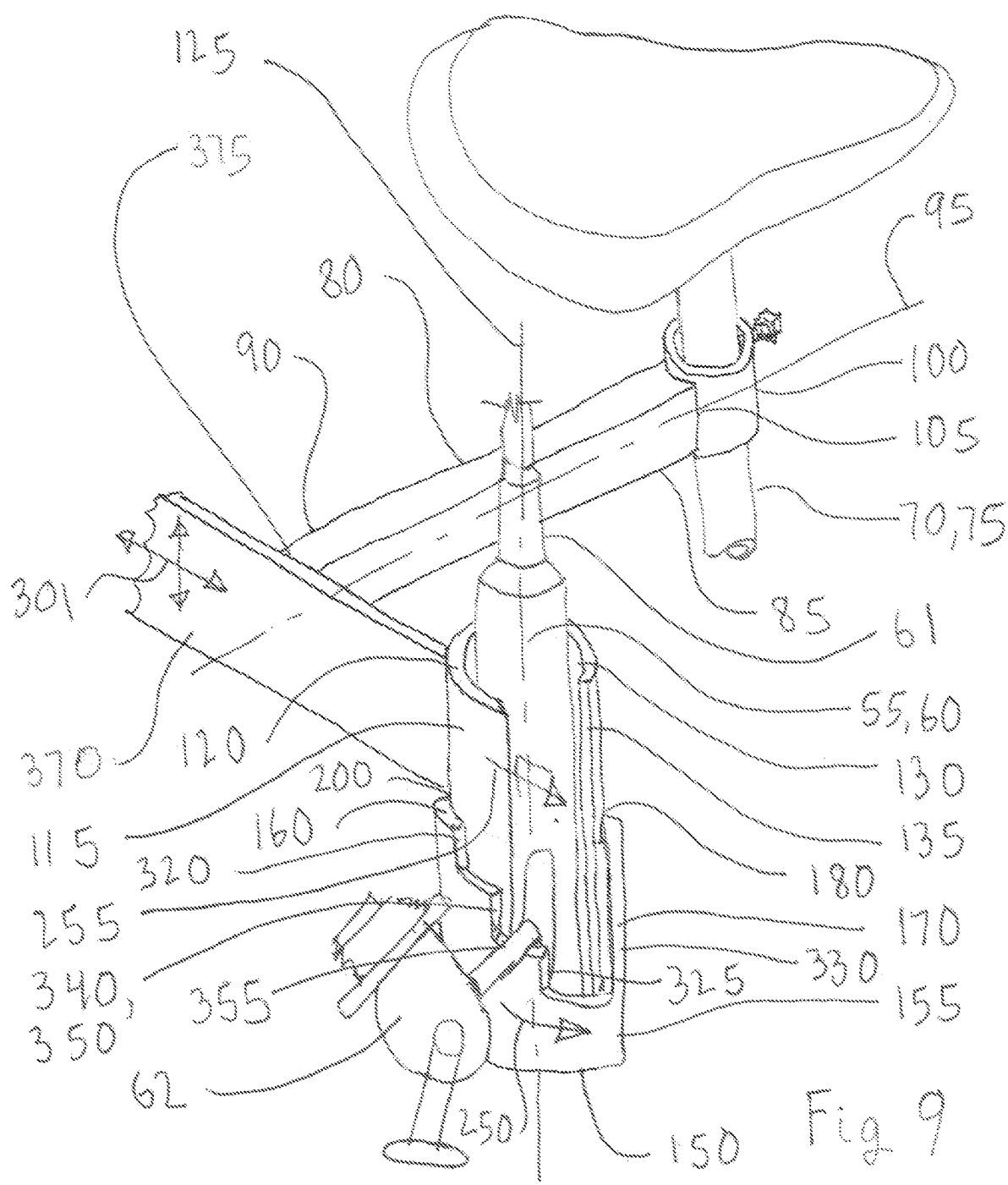

Moving onward, FIG. 9 shows the FIG. 8 perspective view of a detachable accessory carrier 50 in use, wherein FIG. 9 shows the bicycle 70 seat 75 portion shown and an accessory or article 55, 60 in the form of a fishing pole 61 or rod 61 with a fishing reel 62, with the detachable accessory carrier 50 shown that includes the extension beam 80, the means 100 for removable engagement to the bicycle 70 seat post 75, the branching arm 370, the first 115 and second 155 surrounding sidewalls and the first 110 and second 150 bases that are rotationally engaged 315 to one another. Wherein in FIG. 9, the second base 150 and the second surrounding sidewall 155 are rotated 250 about the first base 110 and the first surrounding sidewall 115 to show the ability to selectively open the first open slot 135 with the second surrounding sidewall 155 margin 160 having a stair step configuration 320 for the reel 62 to rest 355 against and the plurality 260 of cantilever flexible tines 210 act to hold and retain the rod 61.

Figure 10:
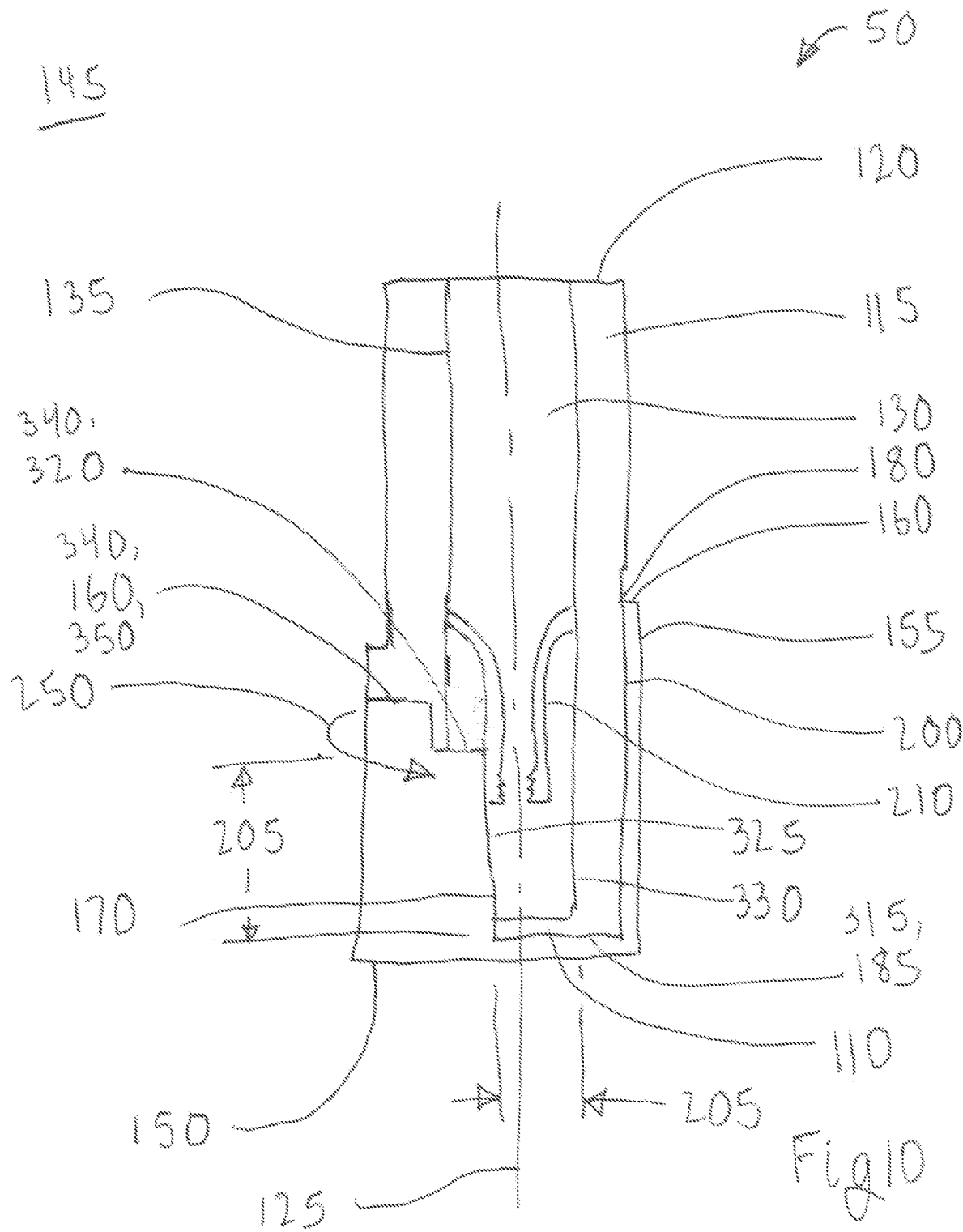
FIG. 10 shows a cross section of the first and second surrounding sidewalls and the first and second bases that are rotationally engaged to one another, also shown are the plurality of cantilever flexible tines, wherein the second base and the second surrounding sidewall are partially rotated about the first base and the first surrounding sidewall to show the ability to selectively control a variable open slot area via rotating the second base and second surrounding sidewall about the first base and first surrounding sidewall, further the second surrounding sidewall margin has a stair step configuration as shown in use in FIG. 9.

Further, FIG. 10 shows a cross section of the first 115 and second 155 surrounding sidewalls and the first 110 and second 150 bases that are rotationally engaged 315 to one another, also shown are the plurality 260 of cantilever flexible tines 210, wherein the second base 150 and the second surrounding sidewall 155 are partially rotated 250 about the first base 110 and the first surrounding sidewall 115 to show the ability to selectively control a variable open slot area 205 via rotating 250 the second base 150 and second surrounding sidewall 155 about the first base 110 and first surrounding sidewall 115, further the second surrounding sidewall 155 margin 160 has a stair step configuration 320 as shown in use in FIG. 9.

Figure 11:
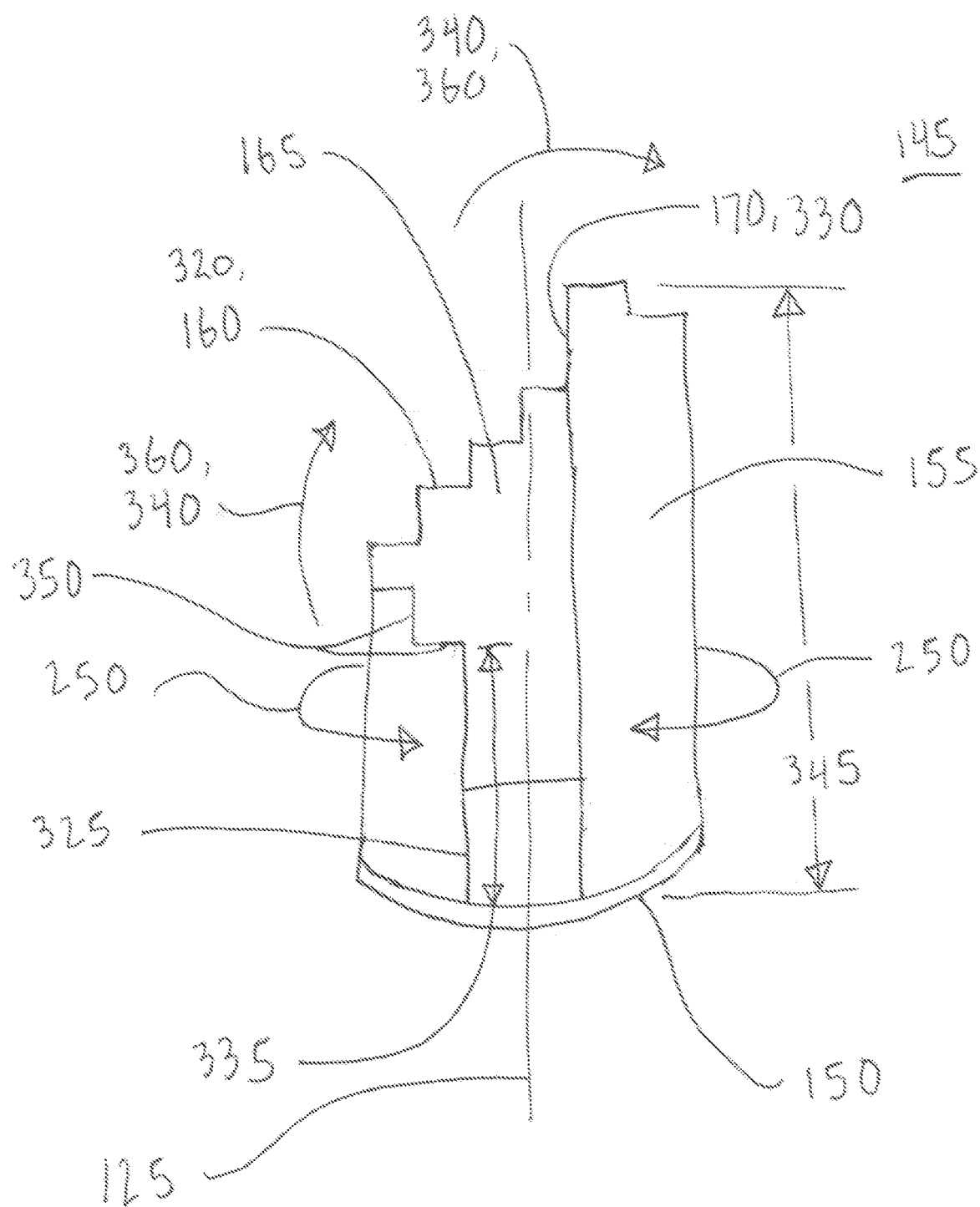
FIG. 11 shows the second surrounding sidewall and second base in particular, focusing particularly of the stair step configuration of the second surrounding sidewall margin, wherein the stair steps progress from a minimum axial stair step distance to the maximum axial stair step distance.

Continuing, FIG. 11 shows the second surrounding sidewall 155 and second base 150 in particular, focusing particularly of the stair step configuration 320 of the second surrounding sidewall 155 margin 160, wherein the stair steps 320 progress 360 from a minimum axial stair step distance 335 to the maximum axial stair step distance 345.

Broadly, the present invention is the detachable article accessory carrier 50 for a bicycle 70 having the seat frame post 75, the detachable accessory carrier 50 including the extension beam 80 having the extension beam 80 proximal end portion 85 and the opposing extension beam 80 distal end portion 90 with the longitudinal axis 95 spanning therebetween, also the means 100 for removable engagement to the seat post 75 wherein the means 100 is disposed 105 on the extension beam 80 proximal end portion 85, the means 100 is preferably a set screw disposed through a circumferential seat post 75 ring wall, see FIGS. 8 and 9 for detail. The detachable article accessory carrier 50 further has the first base 110, the first surrounding sidewall 115 that extends from the first base 110 terminating in the first surrounding sidewall margin 120, the first surrounding sidewall 115 is about a lengthwise axis 125 defining the first interior 130, further the first surrounding sidewall 115 includes a first open slot 135 positioned parallel 140 to the lengthwise axis 125, see FIG. 3, the first open slot 135 runs from the first base to the first surrounding sidewall 115 margin 120 thereby exposing the first interior 130 to an external environment 145 from the first base 110 to the first surrounding sidewall 115 margin 120, see FIGS. 3 to 6 and FIGS. 8 to 10. The first surrounding sidewall 115 is either affixed 365 to the distal end portion 90, or from the branching arm 370 affixed 375 to the distal end portion 90, see FIGS. 8 and 9.

Continuing, the detachable article accessory carrier 50 also includes the second base 150 and the second surrounding sidewall 155 that extends from the second base 150 terminating in the second surrounding sidewall 155 margin 160, the second surrounding sidewall 155 is about the lengthwise axis 125 defining the second interior 165, further the second surrounding sidewall 155 includes the second open slot 170 positioned parallel 175 to the lengthwise axis 125, see FIG. 3. The second open slot 170 runs from the second base 150 to the second surrounding sidewall 155 margin 160 thereby exposing the second interior 165 to an external environment 145 from the second base 150 to the second surrounding sidewall 155 margin 160, wherein the first base 110 and the first surrounding sidewall 115 are slidably nested 180 with the second interior 165 such that the first 110 and second 150 bases are in slidable contact 185 with one another, see FIGS. 1 to 10. Further, the second base 150 to the second surrounding sidewall 155 margin 160 has a second length 195 along the lengthwise axis 125 that is less than a first length 190 along the lengthwise axis 125 from the first base 110 to the first surrounding sidewall 115 margin 120, see FIG. 1. Wherein operationally, the second open slot 170 through rotational engagement 200 of the second surrounding sidewall 155 about the first surrounding sidewall 115 can expose a portion of the first open slot 135 or close off a portion of the first open slot 135 to enable a selectably variable slot open area 205 as between the first 135 and second open slots 170, see FIGS. 3 to 6.

As an option for the detachable accessory carrier 50, it can further comprise the cantilever flexible tine 210 having the tine proximal end portion 215 and the opposing tine distal end portion 220 with the tine axis 225 spanning therebetween, the proximal end portion 215 extending 230 from the first interior 130 side of the first surrounding sidewall 115 toward the lengthwise axis 125 on the distal end portion 220 such that the tine axis 225 is arcuate 235 and substantially parallel 240 to the lengthwise axis 125, see FIGS. 1 to 4, 6, and 10. Wherein operationally the cantilever flexible tine distal end portion 220 contacts 245 the article 55, 60 to actively help retain and hold the article 55, 60 within the first interior 130 wherein the second surrounding sidewall 155 is rotated 250 about the first surrounding sidewall 115 to expand the slot open area 205 to facilitate the article 55, 60 exiting the first interior 130 in a movement 255 perpendicular 255 to the lengthwise axis 125 to allow the cantilever flexible tine distal end portion 220 to release the article 55, 60, as best shown in FIG. 9.

As another option for the detachable accessory carrier 50, it can further comprise a plurality 260 of the cantilever flexible tines 210 wherein each of the cantilever flexible tines 210 are spaced about the lengthwise axis 125 in an equidistant manner 265 outside of the first open slot 135, being operational to help balance a circumferential loading 270 upon the article 55, 60 from the cantilever flexible tine distal end portions 220, see in particular FIG. 6.

A further option for the detachable accessory carrier 50, wherein the tine axes 225 can be angled toward one another in a converging manner in going from the tine proximal end portion 215 to the tine distal end portion 220, such that the plurality 260 of cantilever flexible tines 210 form a frusto-conical shape 275, that is operational to support and retain a multitude of different sized 280 articles 55, 60 and further act to cushion 285 the article 55, 60, from movement 301 of the first surrounding sidewall 115 and the first base 110 (say for instance from the bicycle 70 hitting a bump in the road) via centering the article 55, 60 within the first interior 130 to provide for substantially equidistant cushioning distance 285 as between the article 55, 60 and the first surrounding sidewall 115, see FIGS. 1 to 4, 6, 9, and 10.

Alternatively, for the detachable accessory carrier 50, wherein each cantilever flexible tine distal end portion 220 can further comprise the saw tooth surface 290 that is angled from the proximal end portion 215 to the distal end portion 220 with each saw tooth surface 290 contacting 295 the article 55, 60, to resist movement 300 of the article 55, 60 from the distal end portion 220 to the proximal end portion 215, see FIG. 2 in particular. This is to operationally better secure the article 55, 60 from bouncing out 300 into the external environment 145 from the first surrounding sidewall margin 120 from the first surrounding sidewall 115 movement 301, see FIG. 9, wherein the first base 110 secures the article 55, 60 from moving 305 through the first interior 130 from the first surrounding sidewall margin 120 to the first base 110, see FIG. 2.

A further alternative for the detachable accessory carrier 50, can further comprise the rotationally free fastener 310 disposed between the first 110 and second 150 bases, wherein the fastener 310 is positioned at the lengthwise axis 125, see FIGS. 1 and 7, this is to operationally allow the second base 150 and the second surrounding sidewall 155 to rotate about the first base 110 and the first surrounding sidewall 115 while the first 110 and second 150 bases are rotationally engaged 315 to one another.

Another alternative for the detachable accessory carrier 50, is wherein the second surrounding sidewall margin 160 has the stair step configuration 320 such that the minimum stair step axial distance 335 is on a primary side 325 of the second open slot 170 wherein the stair step configuration 320 circumferentially continues 340 to a secondary side 330 of the second open slot 170 while continuously increasing to a maximum stair step axial distance 345, see FIGS. 9, 10, and 11. This is to operationally accommodate the article 55, 60 in the form of a fishing rod 61 and reel 62, wherein the reel 62 rests 355 against a single stair step 350 for support with the varying stair steps 320 facilitating multiple reels 62 at different distances from the first base 110, see FIG. 9 in particular.

Optionally, for the detachable accessory carrier 50, wherein the stair step configuration 320 can have an even progression 360 from the minimum stair step axial distance 335 to the maximum axial stair step distance 345 to accommodate a range of multiple reels 62 at different distances from the first base 110, see FIG. 11 in particular.

CONCLUSION

Accordingly, the present invention of a detachable accessory carrier has been described with some degree of particularity directed to the embodiments of the present invention. It should be appreciated, though; that the present invention is defined by the following claim construed in light of the prior art so modifications of the changes may be made to the exemplary embodiments of the present invention without departing from the inventive concepts contained therein.

The invention claimed is:

1. A detachable article accessory carrier for a bicycle having a seat frame post, said detachable accessory carrier comprising:
    (a) an extension beam having an extension beam proximal end portion and an opposing extension beam distal end portion with a longitudinal axis spanning therebetween;
    (b) a means for removable engagement to the seat frame post wherein said means is disposed on said extension beam proximal end portion;
    (c) a first base;
    (d) a first surrounding sidewall that extends from said first base terminating in a first surrounding sidewall margin, said first surrounding sidewall is about a lengthwise axis defining a first interior with said first base, further said first surrounding sidewall includes a first open slot positioned parallel to said lengthwise axis, said first open slot runs from said first base to said first surrounding sidewall margin thereby exposing said first interior to an external environment from said first base to said first surrounding sidewall margin;
    (e) a second base;
    (f) a second surrounding sidewall that extends from said second base terminating in a second surrounding sidewall margin, said second surrounding sidewall is about said lengthwise axis defining a second interior with said second base, further said second surrounding sidewall includes a second open slot positioned parallel to said lengthwise axis, said second open slot runs from said second base to said second surrounding sidewall margin thereby exposing said second interior to an external environment from said second base to said second surrounding sidewall margin, wherein said first base and said first surrounding sidewall are slidably nested with said second interior such that said first and second bases are in slidable contact with one another, further said second base to said second surrounding sidewall margin has a second length along said lengthwise axis that is less than a first length along said lengthwise axis from said first base to said first surrounding sidewall margin, wherein operationally said second open slot through rotational engagement of said second surrounding sidewall about said first surrounding sidewall can expose a portion of said first open slot or close off a portion of said first open slot to enable a selectably variable slot open area as between said first and second open slots; and a cantilever flexible tine having a tine proximal end portion and an opposing tine distal end portion with a tine axis spanning therebetween, said proximal end portion extending from said first interior side of said first surrounding sidewall toward said lengthwise axis on said distal end portion such that said tine axis is arcuate and substantially parallel to said lengthwise axis, wherein operationally said cantilever flexible tine distal end portion contacts the article to actively help retain and hold the article within said first interior wherein said second surrounding sidewall is rotated about said first surrounding sidewall to expand said slot open area to facilitate the article exiting said first interior in a movement perpendicular to said lengthwise axis to allow said cantilever flexible tine distal end portion to release the article.

2. A detachable accessory carrier according to claim 1 further comprising a plurality of said cantilever flexible tines wherein each of said cantilever flexible tines are spaced about said lengthwise axis in an equidistant manner outside of said first open slot, being operational to help balance a circumferential loading upon the article from said cantilever flexible tine distal end portions.

3. A detachable accessory carrier according to claim 2 wherein said tine axes are angled toward one another in a converging manner in going from said tine proximal end portion to said tine distal end portion, such that said plurality of cantilever flexible tines form a frustoconical shape, that is operational to support and retain a multitude of different sized articles and further act to cushion the article from movement of the first surrounding sidewall and said first base via centering the article within said first interior to provide for substantially equidistant cushioning distance as between the article and the first surrounding sidewall.

4. A detachable accessory carrier according to claim 3 wherein each said cantilever flexible tine distal end portion further comprises a saw tooth surface that is angled from said proximal end portion to said distal end portion with each said saw tooth surface contacting the article, to resist movement of the article from the distal end portion to the proximal end portion, to operationally better secure the article from bouncing out into the external environment from said first surrounding sidewall margin from said first surrounding sidewall movement, wherein said first base secures the article from moving through said first interior from said first surrounding sidewall margin to said first base.

5. A detachable accessory carrier according to claim 4 further comprising a rotationally free fastener disposed between said first and second bases, wherein said fastener is positioned at said lengthwise axis, to operationally allow said second base and said second surrounding sidewall to rotate about said first base and said first surrounding sidewall while said first and second bases are rotationally engaged to one another.

6. A detachable accessory carrier according to claim 5 wherein said second surrounding sidewall margin has a stair step configuration such that a minimum stair step axial distance is on a primary side of said second open slot wherein said stair step configuration circumferentially continues to a secondary side of said second open slot while continuously increasing to a maximum stair step axial distance, to operationally accommodate the article in the form of a fishing rod and reel, wherein the reel rests against a single stair step for support with said varying stair steps facilitating multiple reels at different distances from said first base.

7. A detachable accessory carrier according to claim 6 wherein said stair step configuration has an even progression from said minimum stair step axial distance to said maximum axial stair step distance to accommodate a range of multiple reels at different distances from said first base.

\* \* \* \* \*